United States Patent
Chakrabarti et al.

(10) Patent No.: US 7,847,437 B2
(45) Date of Patent: Dec. 7, 2010

(54) EFFICIENT OPERATING POINT FOR DOUBLE-ENDED INVERTER SYSTEM

(75) Inventors: Sibaprasad Chakrabarti, Torrrance, CA (US); Gregory S. Smith, Woodland Hills, CA (US); James M. Nagashima, Cerritos, CA (US); Brian A. Welchko, Torance, CA (US); Milun Perisic, Torrance, CA (US); George John, Cerritos, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 212 days.

(21) Appl. No.: 12/106,871

(22) Filed: Apr. 21, 2008

(65) Prior Publication Data

US 2009/0033156 A1 Feb. 5, 2009

Related U.S. Application Data

(60) Provisional application No. 60/952,774, filed on Jul. 30, 2007.

(51) Int. Cl.
*H02J 3/38* (2006.01)
*H02J 3/46* (2006.01)
(52) U.S. Cl. .................................................. 307/82
(58) Field of Classification Search ................ 307/82
See application file for complete search history.

(56) References Cited

U.S. PATENT DOCUMENTS

| | | | | |
|---|---|---|---|---|
| 4,908,565 | A * | 3/1990 | Cook et al. ................. 322/10 |
| 5,027,051 | A * | 6/1991 | Lafferty ..................... 323/222 |
| 5,389,749 | A | 2/1995 | Hokari et al. |
| 5,657,217 | A * | 8/1997 | Watanabe et al. ............. 363/71 |
| 6,242,884 | B1 * | 6/2001 | Lipo et al. .................. 318/808 |
| 6,294,900 | B1 * | 9/2001 | Greenwood et al. ......... 323/222 |
| 6,547,351 | B1 * | 4/2003 | Wilson ......................... 347/9 |
| 6,825,624 | B2 * | 11/2004 | Anwar et al. ................. 318/432 |
| 7,130,205 | B2 | 10/2006 | Peng |
| 7,154,237 | B2 | 12/2006 | Welchko et al. |
| 7,199,535 | B2 | 4/2007 | Welchko et al. |
| 7,439,697 | B2 * | 10/2008 | Miyazaki et al. ......... 318/400.41 |
| 7,579,792 | B2 * | 8/2009 | Nagashima et al. ......... 318/105 |
| 2004/0071003 | A1 * | 4/2004 | Cocconi ..................... 363/132 |
| 2004/0262057 | A1 * | 12/2004 | Kumar ........................ 180/65.2 |

(Continued)

OTHER PUBLICATIONS

Singh, G.K., "Multi-Phase Induction Machine Drive Research—A Survey," Elsevier Science B.V., Electric Power Systems Research, 2002, pp. 139-147.

(Continued)

*Primary Examiner*—Jared Fureman
*Assistant Examiner*—Adi Amrany
(74) *Attorney, Agent, or Firm*—Ingrassia Fisher & Lorenz, P.C.

(57) ABSTRACT

Systems and methods are provided for controlling a double-ended inverter system coupled to a first energy source and a second energy source. The method comprises determining a constant power line associated with operation of the double-ended inverter system, the constant power line representing a desired power flow to the second energy source. The method further comprises determining an operating point on the constant power line, the operating point producing a minimum power loss in the double-ended inverter system for a required output current, and modulating the double-ended inverter system using a first voltage command and a second voltage command corresponding to the operating point.

20 Claims, 6 Drawing Sheets

U.S. PATENT DOCUMENTS

2006/0082341 A1* 4/2006 Cocconi .................... 318/801
2006/0108957 A1* 5/2006 Urakabe et al. ............. 318/139
2009/0033251 A1* 2/2009 Perisic et al. ............... 318/105
2009/0034303 A1* 2/2009 Chakrabarti et al. .......... 363/71

OTHER PUBLICATIONS

Peng, Fang Zheng, "Z-Source Inverter," IEEE Transactions on Industry Applications, Mar./Apr. 2003, vol. 39, No. 2, pp. 504-510.

Jones, Martin et al., "A Six-Phase Series-Connected Two-Motor Drive With Decoupled Dynamic Control," IEEE Transactions on Industry Applications, Jul./Aug. 2005, vol. 41, No. 4, pp. 1056-1066.

Welchko, Brian A., "A Double-Ended Inverter System for the Combined Propulsion and Energy Management Functions in Hybrid Vehicles with Energy Storage," The 31st Annual Conference of the IEEE Industrial Electronics Society, IECON '05, Raleigh, North Carolina, Nov. 6-10, 2005, pp. 1-6.

Levi, Emil et al., "A Series-Connected Two-Motor Six-Phase Drive With Induction and Permanent Magnet Machines," IEEE Transactions on Energy Conversion, Mar. 2006, vol. 21, No. 1, pp. 121-129.

* cited by examiner

EFFICIENT OPERATING POINT FOR DOUBLE-ENDED INVERTER SYSTEM

CROSS-REFERENCE TO RELATED APPLICATION(S)

This application claims the benefit of U.S. provisional patent application Ser. No. 60/952,774, filed Jul. 30, 2007. The entire content of this provisional application is incorporated by reference herein.

TECHNICAL FIELD

Embodiments of the subject matter described herein relate generally to vehicle drive systems, and more particularly, embodiments of the subject matter relate to hybrid vehicles having a double-ended inverter drive system.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Many of the electrical components, including the electric motors used in such vehicles, receive electrical power from alternating current (AC) power supplies. However, the power sources (e.g., batteries) used in such applications provide only direct current (DC) power. Thus, devices known as "power inverters" are used to convert the DC power to AC power, which often utilize several of switches, or transistors, operated at various intervals to convert the DC power to AC power.

Additionally, such vehicles, particularly fuel cell vehicles, often use two separate voltage sources (e.g., a battery and a fuel cell) to power the electric motors that drive the wheels. "Power converters," such as direct current-to-direct current (DC/DC) converters, are typically used to manage and transfer the power from the two voltage sources. Modern DC/DC converters often include transistors electrically interconnected by an inductor. By controlling the states of the various transistors, a desired average current can be impressed through the inductor and thus control the power flow between the two voltage sources.

The utilization of both a power inverter and a power converter greatly increases the complexity of the electrical system of the automobile. The additional components required for both types of devices also increase the overall cost and weight of the vehicle. Systems and methods have been developed for operating a motor coupled to multiple power sources without a DC/DC converter while maximizing the performance of the motor by utilizing dual inverter electrical systems. In a dual inverter system, the voltage required to produce a commanded torque in the motor is provided by the two inverters. Therefore, numerous combinations of voltages can be generated to produce the required torque.

Accordingly, it is desirable to provide methods and systems for determining an optimal operating condition and combination of voltages that minimizes total power loss in the inverter system while maintaining the benefits of a dual inverter system. Other desirable features and characteristics of the present invention will become apparent from the subsequent detailed description and the appended claims, taken in conjunction with the accompanying drawings and the foregoing technical field and background.

BRIEF SUMMARY

A method is provided for controlling a double-ended inverter system coupled to a first energy source and a second energy source. The method comprises determining a constant power line associated with operation of the double-ended inverter system, the constant power line representing a desired power flow to the second energy source. The method further comprises determining an operating point on the constant power line, the operating point producing a minimum power loss in the double-ended inverter system for a required output current, and modulating the double-ended inverter system using a first voltage command and a second voltage command corresponding to the operating point.

A method is provided for controlling a double-ended inverter system coupled to a first energy source and a second energy source. The method comprises determining a constant power line associated with operation of the double-ended inverter system, the constant power line representing a desired power flow to the second energy source, and selecting an initial evaluation point on the constant power line corresponding to an angle of 0° relative to a vector corresponding to a required output current. The method further comprises determining a first voltage command and a second voltage command corresponding to the initial evaluation point, and determining an initial system power loss based on the first voltage command and the second voltage command. For at least one additional evaluation point, the method further comprises increasing the angle relative to the vector corresponding to the required output current, determining a respective first voltage command and a respective second voltage command corresponding to the additional evaluation point, determining a respective system power loss from the respective first voltage command and the respective second voltage command, to obtain a plurality of power loss values. The method comprises identifying a minimum power loss value among the initial system power loss value and the plurality of power loss values, and selecting a designated evaluation point corresponding to the minimum system power loss for use as an operating point.

An apparatus is provided for a double-ended inverter system for use in a vehicle having a first energy source and a second energy source. The double-ended inverter system comprises a first inverter coupled to the first energy source, a second inverter coupled to the second energy source, and a controller coupled to the first inverter and the second inverter, the controller being configured to achieve a desired power flow within the double-ended inverter system. The controller further comprises a computer-readable medium having stored thereon computer-executable instructions for controlling the double-ended inverter system. The controller further comprises computer-executable instructions being written to determine a constant power line associated with operation of the double-ended inverter system, the constant power line representing the desired power flow to the second energy source, determine an operating point on the constant power line, the operating point producing a minimum power loss in the double-ended inverter system for a required output current, and modulate the double-ended inverter system using a first voltage command and a second voltage command corresponding to the operating point.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown herein depict exemplary arrangements of elements, additional intervening elements, devices, features, or components may be present in an embodiment of the depicted subject matter. The terms "first", "second" and other such numerical terms referring to structures do not imply a sequence or order unless clearly indicated by the context.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Figure 1:
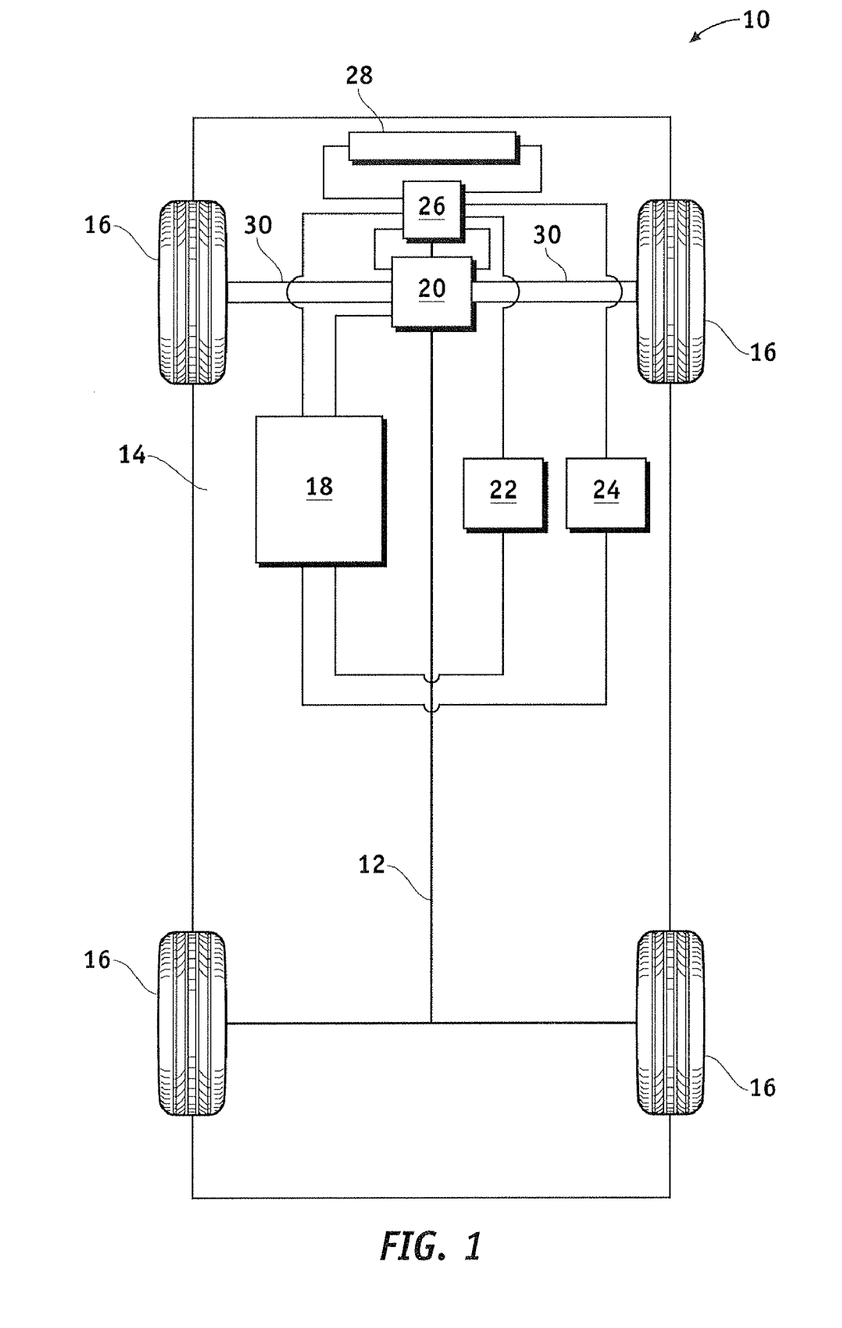
FIG. 1 is a schematic view of an exemplary automobile in accordance with one embodiment.

Referring to FIG. 1, a vehicle, or automobile 10, according to one embodiment of the present invention is shown. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor.

In the exemplary embodiment illustrated in FIG. 1, the automobile 10 further includes a motor 20 (i.e., an electric motor/generator, traction motor, etc.), a first energy source 22, a second energy source 24, a power inverter assembly 26, and a radiator 28. The radiator 28 is connected to the frame at an outer portion thereof and although not illustrated in detail, includes multiple cooling channels that contain a cooling fluid (i.e., coolant), such as water and/or ethylene glycol (i.e., "antifreeze), and is coupled to the power inverter assembly 26 and the motor 20. In one embodiment, the power inverter assembly 26 receives and shares coolant with the motor 20. As shown in FIG. 1, the motor 20 may also include a transmission integrated therein such that the motor 20 and the transmission are mechanically coupled to at least some of the wheels 16 through one or more drive shafts 30.

As shown, the first energy source 22 and the second energy source 24 are in operable communication and/or electrically coupled to the electronic control system 18 and the power inverter assembly 26. Although not illustrated, the first energy source 22 and the second energy source 24 may vary depending on the embodiment and may be of the same or different type. In one or more embodiments, the first energy source 22 and second energy source 24 may each comprise a battery, a fuel cell, an ultracapacitor, or another suitable voltage source. A battery may be any type of battery suitable for use in a desired application, such as a lead acid battery, a lithium-ion battery, a nickel-metal battery, or another rechargeable battery. An ultracapacitor may comprise a supercapacitor, an electrochemical double layer capacitor, or any other electrochemical capacitor with high energy density suitable for a desired application.

Figure 2:
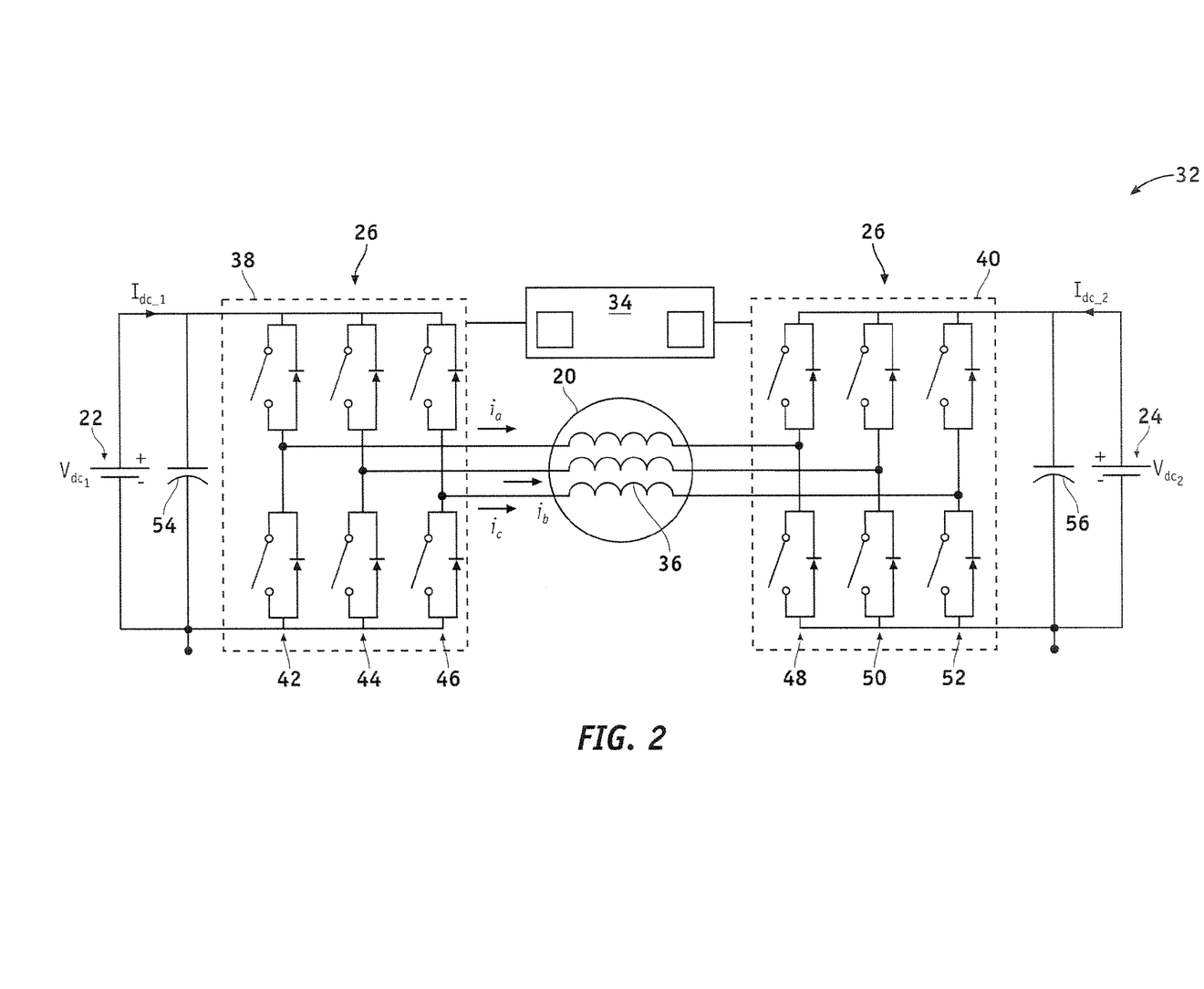
FIG. 2 is a schematic view of a double-ended inverter system in accordance with one embodiment.

Referring now to FIGS. 1 and 2, a double-ended inverter system 32 may be adapted to drive the motor 20 in accordance with one embodiment. The double-ended inverter system 32 includes the motor 20, the first energy source 22, the second energy source 24, the power inverter assembly 26, and a controller 34.

The motor 20 is a multi-phase alternating current (AC) motor and includes a set of windings 36 (or coils), wherein each winding corresponds to one phase of the motor 20. In an exemplary embodiment, the motor 20 is a three-phase motor, however, the principles discussed herein may apply to a motor 20 with any number of phases, and may be modified accordingly as will be appreciated in the art. Although not illustrated, the motor 20 includes a stator assembly (including the coils), a rotor assembly (including a ferromagnetic core), and a cooling fluid (i.e., coolant), as will be appreciated by one skilled in the art. The motor 20 may be an induction motor, a permanent magnet motor, or any type suitable for the desired application.

Referring again to FIG. 2, the power inverter assembly 26 includes a first inverter 38 and a second inverter 40, each including six switches (e.g., semiconductor devices, such as transistors and/or switches) with antiparallel diodes (i.e., antiparallel to each switch). As shown, the switches in the inverters 38, 40 are arranged into three legs (or pairs), with legs 42, 44, and 46 being in the first inverter 38 and legs 48, 50, and 52 being in the second inverter 40. A first of the windings 36 of the motor 20 is electrically connected, at opposing ends thereof, between the switches of leg 42 in the first inverter 38 and leg 48 in the second section. A second of the windings 36 is connected between the switches of leg 44 in the first inverter 38 and leg 50 of the second inverter 40. A third of the windings 36 is connected between the switches of legs 46 and 52 as shown.

Still referring to FIG. 2, the double-ended inverter system 32 may also include first and second capacitors 54 and 56 respectively connected in parallel with the first and second energy sources 22, 24 to smooth current ripple during operation. The controller 34 is in operable communication and/or electrically coupled to the first and second inverters 38, 40. The controller 34 is responsive to commands received from the driver of the automobile 10 (i.e. via an accelerator pedal) and provides commands to the first inverter 38 and the second inverter 40, as will be described, to control the output of the inverters 38, 40.

Referring again to FIG. 1, the electronic control system 18 is in operable communication with the motor 20, the first energy source 22, the second energy source 24, and the power inverter assembly 26. Although not shown in detail, the electronic control system 18 may include various sensors and automotive control modules, or electronic control units (ECUs), such as an inverter control module (i.e., the controller 34 shown in FIG. 2) and a vehicle controller, and at least one processor and/or a memory which includes instructions stored thereon (or in another computer-readable medium) for carrying out the processes and methods as described below.

During operation, the automobile 10 is operated by providing power to the wheels 16 with the motor 20 which receives power from the first energy source 22 and the second energy source 24 in an alternating manner and/or with the first energy source 22 and the second energy source 24 simultaneously. In order to power the motor 20, DC power is provided from the first energy source 22 and the second energy source 24 to the first and second inverters 38, 40 respectively, which convert the DC power into AC power, as is commonly understood in the art. The first and second inverters 38, 40 produce AC voltages across the windings 36 (or phases). As is commonly understood, the required voltages across the windings 36 of the motor 20 are dependent on the speed, commanded torque (i.e., commanded synchronous frame currents), and other motor parameters.

Figure 3:
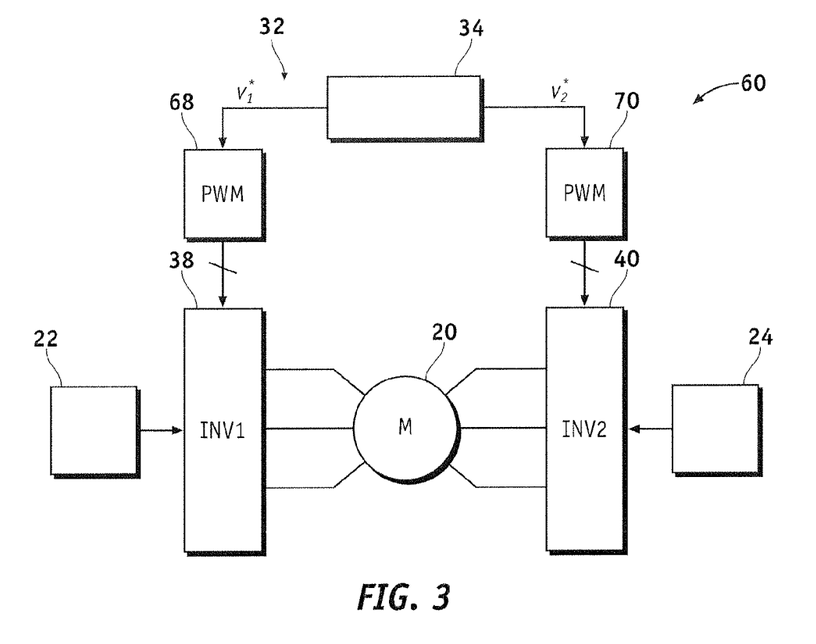
FIG. 3 is a schematic view of a control system for operating the double-ended inverter system of FIG. 2 in accordance with one embodiment.

FIG. 3 illustrates a control system 60 for operating a motor 20 in a double-ended inverter system 32 utilizing the principles described herein in accordance with one embodiment. High frequency pulse width modulation (PWM) may be employed by the controller 34 to modulate the inverter output phase voltages and control the inverters 38, 40 and manage the voltages produced by the inverters 38, 40. The control system 60 includes first and second PWM blocks 68 and 70, and the double-ended inverter system 32.

The controller 34 provides a control algorithm that achieves desired power flow between the first and second energy sources 22, 24 while producing the commanded torque inside the motor 20. Although not shown, the control system 60 receives a torque command for the motor 20 from which the controller 34 may determine power commands for the first energy source 22 (and/or the first inverter 38) and the second energy source 24 (and/or the second inverter 40), as well as synchronous frame currents for the windings 36 within the motor 20.

Many combinations of voltage across the windings 36 may produce the commanded torque in the motor 20 and achieve desired power flow to (or from) the energy sources 22, 24 and the motor 20. If the motor 20 does not require the maximum power output of one energy source 22 or 24, the extra power from the energy source 22 or 24 may be used to charge the other energy source 22 or 24. For illustrative purposes and the sake of brevity, it may be discussed as though the first energy source 22 produces excess power to charge the second energy source 24, however, it will be appreciated by those skilled in the art that numerous alternative desired power flows are possible and this distinction is not limiting but made merely for reference purposes. A chosen operating point determines the modulating voltage across the terminals of the inverters 38, 40.

The controller 34 provides the first and second PWM blocks 68 and 70 with modulating voltage signals $v^*_1$ and $v^*_2$ to generate PWM signals to operate the switches within the first and second inverters 38, 40 to cause the desired output voltages to be applied across the windings 36 within the motor 20 to operate the motor 20 with the required torque. It will be appreciated by those skilled in the art that the control system 60 can be further modified to incorporate appropriate feedback signals and other methods known in the art to control the inverters 38, 40, which are beyond the scope of this disclosure.

The controller 34 may comprise any type of control module or vehicle controller known in the art, and can be equipped with nonvolatile memory, random access memory (RAM), discrete and analog input/output (I/O), a central processing unit, and/or communications interfaces for networking within an automotive communications network. In this regard, the controller 34, and possibly other illustrative blocks, modules, processing logic, and circuits described in connection with the embodiments disclosed herein may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A processor may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

Moreover, the steps of a method or algorithm described in connection with the embodiments disclosed herein may be embodied directly in hardware, in firmware, in a software module executed by a processor, or in any practical combination thereof. A software module may reside in RAM memory, flash memory, ROM memory, EPROM memory, EEPROM memory, registers, a hard disk, a removable disk, a CD-ROM, or any other form of storage medium known in the art. In this regard, an exemplary storage medium can be coupled to a processor such that the processor can read information from, and write information to, the storage medium. In the alternative, the storage medium may be integral to the processor. As an example, the processor and the storage medium may reside in an ASIC.

The subject matter and certain aspects of the embodiments thereof may be described in the general context of computer-executable instructions, such as program modules, executed by one or more computing modules, controllers, or other devices. Generally, program modules include routines, programs, objects, components, data structures, and/or other elements that perform particular tasks or implement particular abstract data types. Typically, the functionality of the program modules may be combined or distributed as desired in various embodiments. A computing device that performs computer-executable instructions typically includes at least some form of computer readable media. Computer readable media can be any available media that can be accessed by a computing device and/or by applications executed by a computing device.

Figure 4:
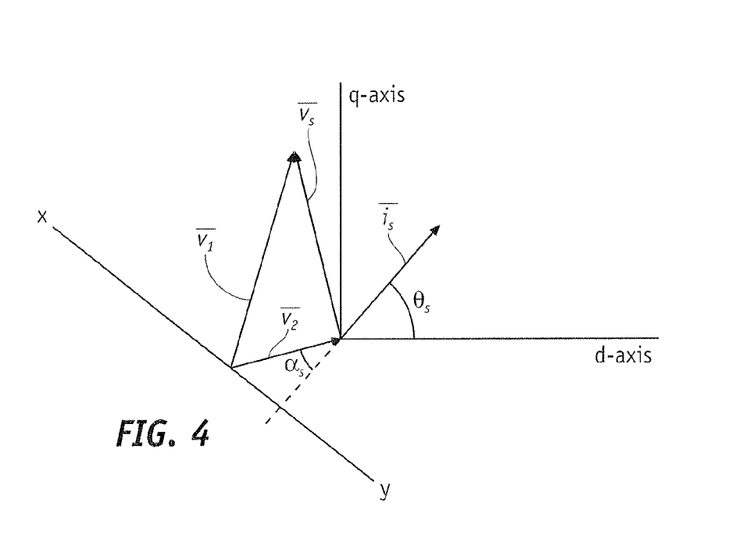
FIGS. 4 and 5 are graphical vector illustrations of combinations of voltage commands in accordance with one embodiment.

Referring now to FIG. 4, the controller 34 may be configured to determine a current required to produce a commanded or desired torque in the motor 20 (i.e., the desired or required current in the windings 36), represented by current vector $\overline{i}_s$. The voltage vector $\overline{v}_s$ represents the corresponding voltage across the windings 36 necessary to produce $\overline{i}_s$. Vectors $\overline{v}_1$ and $\overline{v}_2$ represent first and second voltage commands (or alternatively, voltages provided to/from) the first inverter 38 and the second inverter 40, respectively, to produce the necessary voltage across the windings 36 (i.e., the difference between $\overline{v}_1$ and $\overline{v}_2$). The controller 34 may also determine a desired power flow to the second energy source 24. The desired power flow to the second energy source 24 can be represented using a constant power line, labeled xy as shown. The constant power line is characterized by $P = 3|\overline{v}_2||\overline{i}_s|\sin\alpha_s$, where $\alpha_s$ is the angle of $\overline{v}_2$ relative to $\overline{i}_s$, and P represents the desired power flow to/from the second energy source. The constant power line represents the power flow to/from the second energy source 24 depending on whether the second energy source 24 is charging or discharging.

Figure 5:
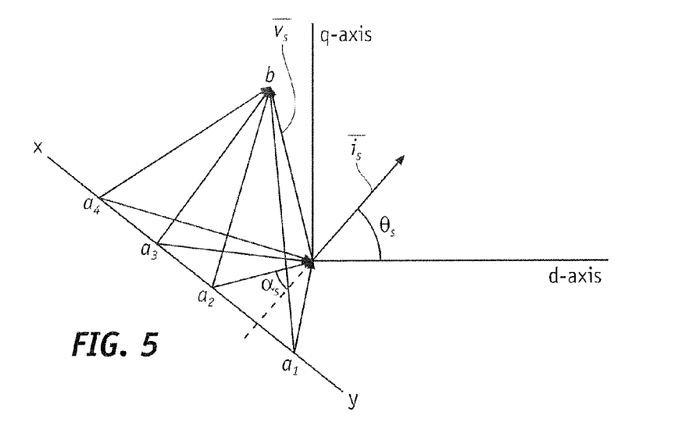

Referring to FIG. 5, numerous operating points (i.e., $a_1, a_2, a_3, a_4 \ldots a_n$) along the constant power line can provide the required voltage ($\overline{v}_s$) across the windings 36. Each operating point $a$, corresponds to a unique combination of voltage commands ($\overline{v}_1$ and $\overline{v}_2$). While numerous operating points are capable of producing the same voltage $\overline{v}_s$ and power flow to/from the second energy source, each point along the constant power line results in a different power loss in the double-ended inverter system 32. Each voltage command is associated with a different inverter switching function (or modulation index) and produces different inverter switching loss.

Figure 6:
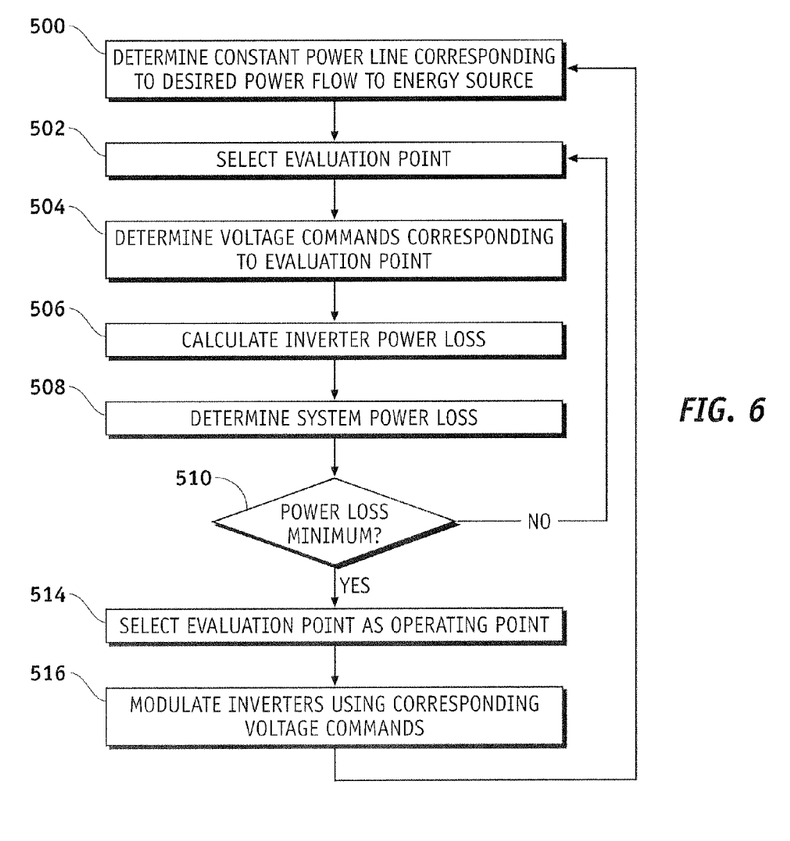
FIG. 6 is a flow chart that illustrates an embodiment of a process for determining an operating point of a double-ended inverter system.

Referring to FIGS. 5 and 6, in an exemplary embodiment, an operating point $a_n$ can be determined that reduces system power loss, while achieving the desired power flow to the second energy source and producing the commanded torque in the motor. In accordance with one embodiment, a commanded or desired torque is provided to the controller. The controller may also be configured to determine a required output current $\overline{i}_s$ and required voltage $\overline{v}_s$ to produce the commanded torque. The controller may be configured to determine a desired power flow to the second energy source and a constant power line corresponding to the desired power flow (task 500). An initial point $a_0$ on the constant power line may be chosen as an initial evaluation point (task 502). In an exemplary embodiment, the initial evaluation point may be chosen where the angle $\alpha_s$, between $\overline{v}_2$ and $\overline{i}_s$, equals 0° (see, for example, FIG. 4 and FIG. 5, which depict $\alpha_s$). The controller may determine a first inverter voltage command ($\overline{v}_1$) and a second inverter voltage command ($\overline{v}_2$) corresponding to the evaluation point (task 504). For example, this may be done by determining a second voltage command $\overline{v}_2$, and subtracting $\overline{v}_2$ from $\overline{v}_s$ to achieve the required first voltage command $\overline{v}_1$ to produce $\overline{v}_s$.

In an exemplary embodiment, the first and second inverter power loss is calculated based on the voltage commands $\overline{v}_1$ and $\overline{v}_2$ (task 506). As used here, inverter power loss includes conduction power loss (based on the forward voltage drop and current for each switch) and a switching loss (based on the DC voltage level of the energy source, the peak AC phase current, and the inverter switching frequency) as is understood in the art. The power loss in an inverter may be determined for an output phase voltage peak (based on $\overline{v}_1$ or $\overline{v}_2$) and the power factor (based on the voltage command angle relative to $\overline{i}_s$). The power loss is also based on the energy source voltage coupled to the inverter, the peak motor phase current, and the inverter switching frequency, which may remain constant for all operating points $a_n$.

Figure 7:
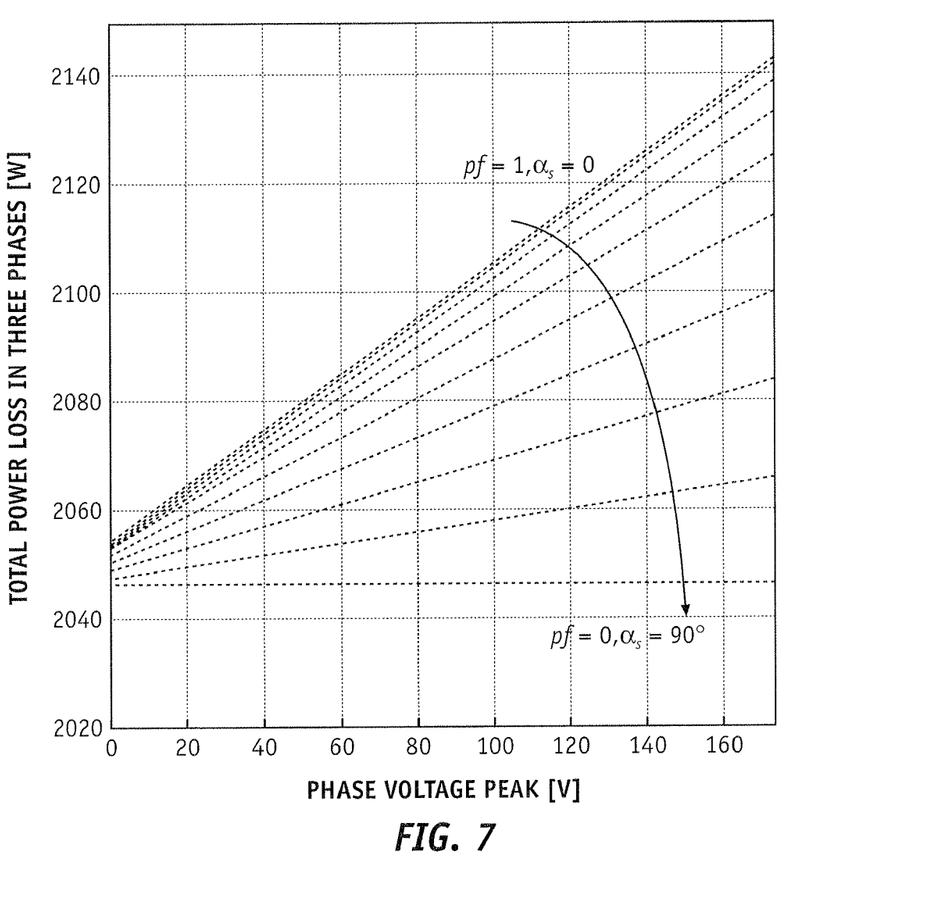
FIG. 7 is a graph that illustrates inverter power loss versus peak phase voltage for an exemplary case.

FIG. 7 is a graph that illustrates inverter power loss versus output phase voltage peak (i.e., a peak value of a voltage command) for a range of power factors in an exemplary case. In an exemplary embodiment, inverter power loss values may be determined for an energy source voltage, peak motor phase current, and inverter switching frequency. In FIG. 7, the energy source DC voltage is 300 $V_{DC}$, peak motor phase current ($I_p$) is 400 A, and the inverter switching frequency ($f_{sw}$) is 10 kHz. The power loss values may be predetermined and/or stored in a database, lookup table, graph, or some other computer-readable medium coupled to the controller, a processor, or some other control module. It will be appreciated by those in the art that certain linear relationships part of the inverter power loss calculation allows for extrapolating values (for use in lookup tables, databases, graphs, etc.), and does not require calculation or measurement for every output phase voltage peak and power factor as will be understood.

Referring again to FIG. 6, in an exemplary embodiment, the double-ended inverter system total power loss is determined by adding the first and second inverter losses (task 508). In accordance with one embodiment, predetermined and/or stored first and second inverter losses may be obtained for an evaluation point based on the voltage commands ($\overline{v_1}$ or $\overline{v_2}$) and the angle relative to $\overline{i_s}$ corresponding to the evaluation point.

In an exemplary embodiment, the controller may be configured to determine whether the power loss for the double-ended inverter system for a selected evaluation point is a minimum for the corresponding desired motor current $\overline{i_s}$ and desired power flow (task 510). In accordance with one embodiment, if the minimum system power loss has not been determined, the controller may repeat the process by selecting another evaluation point on the constant power line (task 502). This may be done by incrementally increasing the angle $\alpha_s$ ($\alpha_s \Leftarrow \alpha_s + \Delta\alpha$) of the evaluation point on the constant power line relative to $\overline{i_s}$. The loop defined by tasks 502, 504, 506, 508, 510 may be repeated until a minimum power loss in the double-ended inverter system is determined. It will be apparent to those skilled in the art that various methods or means for determining a minimum and the manner of selecting evaluation points may vary depending on the design or needs of the system.

In an exemplary embodiment, the controller may select the evaluation point corresponding to the minimum power loss as the operating point for the double-ended inverter system (task 514). The controller may modulate the first and second inverter using the voltage commands ($\overline{v_1}$ and $\overline{v_2}$) corresponding to the operating point (task 516). The controller may repeat the entire process dynamically as the desired power flow to/from the second energy source 24 or the required (or desired) motor current $\overline{i_s}$ changes over time.

Figure 8:
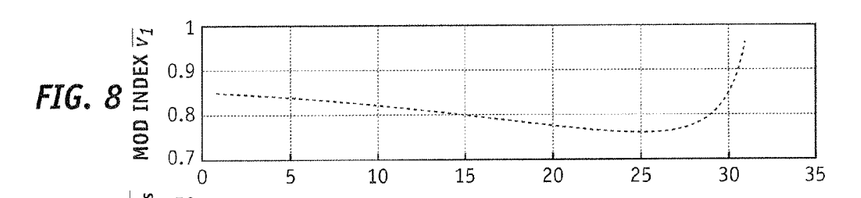
FIGS. 8-12 are graphs that illustrate operating characteristics of a double-ended inverter system corresponding to different evaluation points for an exemplary case.
Figure 9:
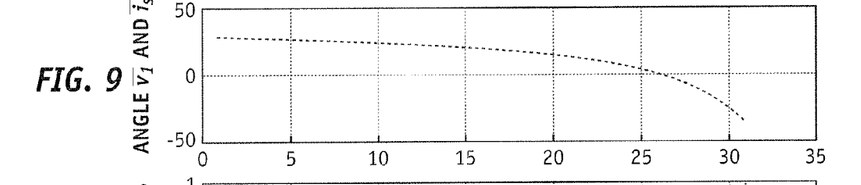
Figure 10:
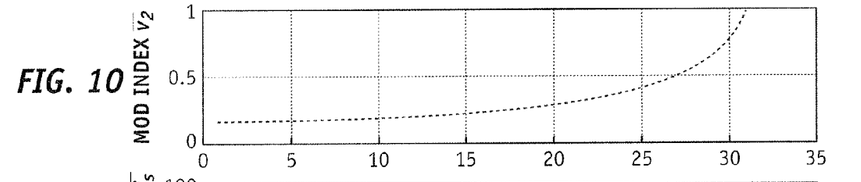
Figure 11:
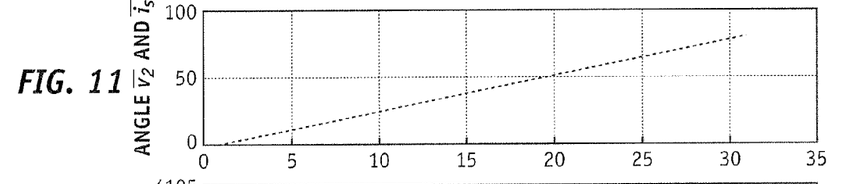
Figure 12:
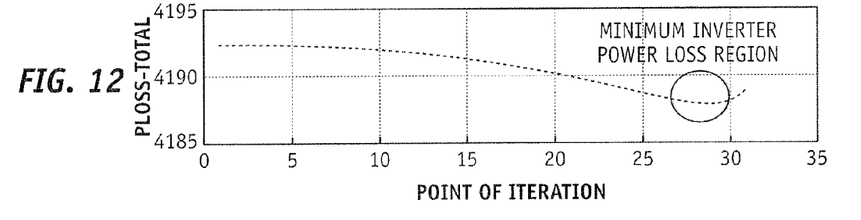

FIGS. 8-12 are graphs that illustrate operating characteristics of a double-ended inverter system corresponding to different evaluation points for an exemplary case using the values from FIG. 7. As shown in FIG. 11, an initial evaluation point may be chosen by selecting an angle between $\overline{v_2}$ and $\overline{i_s}$ of 0° (vertical axis) for a first point of iteration (point of iteration 1 on the horizontal axis). The angle between $\overline{v_2}$ and $\overline{i_s}$ may be incrementally increased from 0° to 90° through multiple points of iteration as shown. Increasing the angle between $\overline{v_2}$ and $\overline{i_s}$ also produces corresponding changes to $\overline{v_1}$ and the modulation index of the first and second inverters as shown in FIGS. 8-10. As shown in FIG. 12, when the first inverter loss and second inverter loss are added for each point of iteration, an efficient operating point producing a minimum double-ended inverter system power loss can be identified. The first and second voltage commands ($\overline{v_1}$ and $\overline{v_2}$) corresponding to the operating point can be used to modulate the first and second inverters.

The system and/or method described above provides an electrical system to power the motor 20 with two separate energy sources 22, 24 while reducing the switching loss, and thereby, the total system loss. Other features of a double-ended inverter system 32, such as various power flows or power transfer, may also be achieved. As the described above, the performance of the motor 20 is not impaired as the commanded torque may still be generated within the motor 20, while allowing excess power to flow between the energy sources 22, 24.

Other embodiments may utilize the system and method described above in different types of automobiles, different vehicles (e.g., watercraft and aircraft), or in different electrical systems altogether, as it may be implemented in any situation where the voltages of the two sources dynamically change over a wide range. The motor 20 and the inverters 38, 40 may have different numbers of phases, and the systems described herein should not be construed as limited to a three-phase design. Other forms of energy sources 22, 24 may be used, such as current sources and loads including diode rectifiers, thyristor converters, fuel cells, inductors, capacitors, and/or any combination thereof. Based on design preferences, system components and methods may be implemented in various combinations of hardware and/or software as will be understood in the art.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for controlling a double-ended inverter system coupled to a first energy source and a second energy source, the double-ended inverter system including a controller and a motor, the method comprising:
   determining, by the controller, a required output current for producing a commanded torque in the motor;
   determining, by the controller, a required voltage for producing the required output current in the motor;
   determining, by the controller, a constant power line associated with operation of the double-ended inverter system, the constant power line representing a desired power flow to the second energy source, each point along the constant power line corresponding to a combination of voltage commands capable of producing the required voltage while achieving the desired power flow to the second energy source;
   determining, by the controller, an operating point on the constant power line, the operating point producing a minimum power loss in the double-ended inverter system for the required output current, the operating point comprising a first voltage command and a second voltage command; and
   modulating, by the controller, the double-ended inverter system using the first voltage command and the second voltage command to operate the double-ended inverter system at the operating point.

2. The method of claim 1, wherein determining the operating point on the constant power line further comprises:
selecting a plurality of evaluation points on the constant power line;
for each of the plurality of evaluation points:
determining a respective first voltage command and a respective second voltage command corresponding to an evaluation point;
determining a respective power loss value based on the respective first voltage command and the respective second voltage command, to obtain a plurality of power loss values;
identifying a minimum power loss value from the plurality of power loss values; and
selecting a designated evaluation point corresponding to the minimum power loss value for use as the operating point.

3. The method of claim 2, further comprising:
calculating a first inverter loss based on a peak value of the respective first voltage command, an angle of the respective first voltage command relative to the required output current, a voltage level of the first energy source, and a first inverter switching frequency; and
calculating a second inverter loss based on a peak value of the respective second voltage command, an angle of the respective second voltage command relative to the required output current, a voltage level of the second energy source, and a second inverter switching frequency.

4. The method of claim 3, wherein determining the respective power loss value further comprises adding the first inverter loss and the second inverter loss.

5. The method of claim 3, further comprising storing data indicative of the first inverter loss and the second inverter loss.

6. The method of claim 5, further comprising:
obtaining a stored first inverter loss corresponding to the peak value of the respective first voltage command and the angle of the respective first voltage command relative to the required output current; and
obtaining a stored second inverter loss corresponding to the peak value of the respective second voltage command and the angle of the respective second voltage command relative to the required output current.

7. The method of claim 6, wherein determining the respective power loss value further comprises adding the stored first inverter loss and the stored second inverter loss.

8. A method for controlling a double-ended inverter system coupled to a first energy source and a second energy source, the double-ended inverter system including a controller and a motor, the method comprising:
determining a constant power line associated with operation of the double-ended inverter system, the constant power line representing a desired power flow to the second energy source, each point along the constant power line being capable of producing an output current in the motor to achieve a commanded torque;
selecting an initial evaluation point on the constant power line corresponding to an angle of 0° relative to a vector corresponding to a required output current;
determining a first voltage command and a second voltage command corresponding to the initial evaluation point;
determining an initial system power loss based on the first voltage command and the second voltage command;
for at least one additional evaluation point:
increasing the angle relative to the vector corresponding to the required output current;
determining a respective first voltage command and a respective second voltage command corresponding to the additional evaluation point; and
determining a respective system power loss from the respective first voltage command and the respective second voltage command, to obtain a plurality of power loss values;
identifying a minimum power loss value among the initial system power loss value and the plurality of power loss values;
selecting a designated evaluation point on the constant power line corresponding to the minimum power loss value for use as an operating point; and
operating, by the controller, the double-ended inverter system in accordance with the operating point to achieve the desired power flow to the second energy source and the commanded torque in the motor.

9. The method of claim 8, wherein determining the second voltage command is based on $P=3|\bar{v}_2||\bar{i}_s|\sin \alpha_s$, where $\bar{v}_2$ is the second voltage command, $\bar{i}_s$ is the required output current, $\alpha_s$ is the angle relative to the required output current, and P is a constant based on the constant power line.

10. The method of claim 9, wherein determining the first voltage command is based on the second voltage command and a required output voltage, by subtracting the second voltage command from the required output voltage.

11. The method of claim 10, further comprising:
calculating a first inverter loss based on a peak value of the first voltage command, an angle of the first voltage command relative to the required output current, a voltage level of the first energy source, and a first inverter switching frequency; and
calculating a second inverter loss based on a peak value of the second voltage command, an angle of the second voltage command relative to the required output current, a voltage level of the second energy source, and a second inverter switching frequency.

12. The method of claim 11, wherein determining a system power loss further comprises adding the first inverter loss and the second inverter loss.

13. The method of claim 11, further comprising storing data indicative of the first inverter loss and the second inverter loss.

14. The method of claim 13, further comprising:
obtaining a stored first inverter loss corresponding to the peak value of the first voltage command and the angle of the first voltage command relative to the required output current; and
obtaining a stored second inverter loss corresponding to the peak value of the second voltage command and the angle of the second voltage command relative to the required output current.

15. The method of claim 14, wherein determining a system power loss further comprises adding the stored first inverter loss and the stored second inverter loss.

16. The method of claim 8, wherein operating the double-ended inverter system comprises modulating the double-ended inverter system using the first voltage command and the second voltage command corresponding to the operating point.

17. A double-ended inverter system for use with a motor in a vehicle having a first energy source and a second energy source, the double-ended inverter system comprising:
a first inverter coupled to the first energy source and the motor;
a second inverter coupled to the second energy source and the motor; and a controller coupled to the first inverter and the second inverter, the controller being configured to achieve a desired power flow within the double-ended inverter system, and the controller comprising a computer-readable medium having stored thereon computer-executable instructions for controlling the double-ended inverter system, the computer-executable instructions being written to:

determine a required output current for producing a commanded torque in the motor;

determine a constant power line associated with operation of the double-ended inverter system, the constant power line representing the desired power flow to the second energy source, each point on the constant power line corresponding to a combination of voltage commands capable of producing the required output current;

determine an operating point on the constant power line, the operating point producing a minimum power loss in the double-ended inverter system for the required output current;

modulate the first inverter using a first voltage command corresponding to the operating point; and modulate the second inverter using a second voltage command corresponding to the operating point to achieve the desired power flow to the second energy source and the commanded torque in the motor.

18. The double-ended inverter system of claim 17, the computer-executable instructions being written to:

select a plurality of evaluation points on the constant power line;

for each of the plurality of evaluation points:
determine a respective first voltage command and a respective second voltage command corresponding to an evaluation point;
determine a respective power loss value based on the respective first voltage command and the respective second voltage command, to obtain a plurality of power loss values;

identify a minimum power loss value from the plurality of power loss values; and select a designated evaluation point corresponding to the minimum power loss value for use as the operating point.

19. The double-ended inverter system of claim 18, the computer-executable instructions being written to:

calculate a first inverter loss based on a peak value of the respective first voltage command, an angle of the respective first voltage command relative to the required output current, a voltage level of the first energy source, and a first inverter switching frequency; and calculate a second inverter loss based on a peak value of the respective second voltage command, an angle of the respective second voltage command relative to the required output current, a voltage level of the second energy source, and a second inverter switching frequency; and store the first inverter loss and the second inverter loss.

20. The double-ended inverter system of claim 19, the computer-executable instructions being written to:

obtain a stored first inverter loss corresponding to the peak value of the respective first voltage command and the angle of the respective first voltage command relative to the required output current; and obtain a stored second inverter loss corresponding to the peak value of the respective second voltage command and the angle of the respective second voltage command relative to the required output current; and add the stored first inverter loss and the stored second inverter loss.

* * * * *